Patented June 24, 1930

1,766,820

UNITED STATES PATENT OFFICE

RICHARD HERZ, OF FRANKFORT-ON-THE-MAIN, AND MAX SCHUBERT, OF FECHEN-HEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

ORTHO-CYANARYLSULPHOCYANOGEN COMPOUNDS AND PROCESS OF MAKING SAME

No Drawing. Application filed March 15, 1928, Serial No. 262,032, and in Germany March 17, 1927.

We have found that in a smooth reaction ortho-cyano-arylsulphocyanogen compounds can be obtained by starting from ortho-amino-arylsulphocyanogen compounds of the general formula:

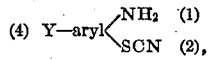

wherein Y means that the 4-position is blocked, which compounds are e. g. obtainable according to the process described in an application in the name of Kaufmann and Schubert, filed March 6, 1928, Ser. No. 259,602.

The diazo compounds of the ortho-amino-arylsulphocyanogen compounds are converted into the corresponding ortho-cyano-aryl-sulphocyanogen compounds according to Sandmeyer's reaction. These new substances correspond to the general formula:

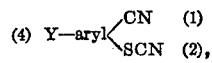

wherein Y means that the 4-position is blocked. It is a surprising fact, that this reaction runs smoothly and leads to pure products with a very good yield, because these ortho-aminoaryl-sulphocyanogen compounds are rather unstable and are easily converted into the isomeric thiazole compounds by treatment in an acidic medium (see Kaufmann et al., application Ser. No. 183,228, filed April 12, 1927).

In order to further illustrate our invention, the following examples are given, the parts being by weight and all temperatures in centigrade degrees. We wish it however to be understood that we are not limited to the particular products nor reaction conditions mentioned therein.

Example 1

Production of the 1-methyl-2-cyano-3-sulphocyano-5-chlorobenzene of the formula:

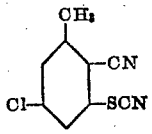

64 parts of 1-methyl-2-amino-3-sulphocyanogen-5-chlorobenzene, obtainable for instance according to Example 3 of the aforesaid application Ser. No. 259,602, filed March 6, 1928, in the name of Hans Kaufmann and Max Schubert, are suspended while stirring in 2,000 parts of water, mixed with 150 parts of hydrochloric acid ($d=1,15$) and diazotized at about 5° with a solution of 30 parts of sodium nitrite in 500 parts of water. After about 1 hour the solution of the diazocompound is allowed to run at 50–60° into 1,000 parts of a solution of cuprous cyanide, which is prepared from 84 parts of copper sulphate and 50 parts of sodium cyanide. The mass is neutralized and cooled down. The separated cyanocompound is filtered off, washed and may be directly used for the further process. It crystallizes from spirit as colorless leaflets of the melting point about 86°.

Example 2

Production of the 1-cyano-2-sulphocyanogen-4-ethoxybenzene of the formula:

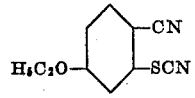

50 parts of 1-amino-2-sulphocyanogen-4-ethoxybenzene are dissolved in an excess of dilute hydrochloric acid and diazotized at 8–10° with the calculated amount of nitrite. The diazosolution is poured at 50–60° into a solution of cuprous cyanide prepared from 82 parts of copper sulphate and 58 parts of sodium cyanide with addition of 200 parts of sodium bicarbonate. After a short time the reaction mass is cooled down and the separated reaction product is filtered off. It crystallizes from spirit as colorless needles melting at 112–115°. It is easily soluble in organic solvents, insoluble in water and in a cold caustic soda solution.

Example 3

When in the foregoing examples the 1-amino-2-sulphocyanogen-4-ethoxybenzene is replaced by the equivalent amount of 1-sulphocyanogen-2-amino-naphthalene and otherwise the process is carried out in the same manner, the new 1-sulphocyanogen-2-cyano-naphthalene is obtained corresponding to the formula:

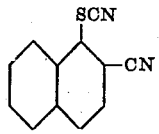

It crystallizes from spirit as colorless needles of the melting point 135-136°.

We claim:

1. A process which comprises diazotizing ortho-amino-aryl-sulphocyanogen compounds of the general formula:

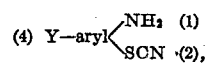

wherein Y means that the 4-position is blocked, and treating the diazo-compounds thus formed with cuprous cyanide according to Sandmeyer's reaction.

2. As new products cyano-aryl-sulphocyanogen compounds of the general formula:

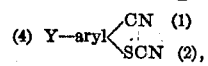

wherein Y means that the 4-position is blocked, which products are colorless crystalline substances having a definite melting point, soluble in organic solvents, insoluble in water.

3. A process which comprises diazotizing the 1-methyl-2-amino-3-sulphocyanogen-5-chlorobenzene of the formula:

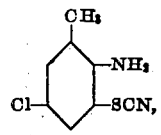

and treating the diazocompound thus formed with cuprous cyanide according to Sandmeyer's reaction.

4. As a new product the 1-methyl-2-cyano-3-sulphocyanogen-5-chlorobenzene of the formula:

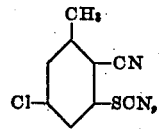

which product represents when recrystallized from spirit colorless leaflets melting at about 86°, soluble in organic solvents, insoluble in water.

In testimony whereof, we affix our signatures.

RICHARD HERZ.
MAX SCHUBERT.